United States Patent [19]

Kindig et al.

[11] 4,313,258

[45] Feb. 2, 1982

[54] METHODS AND APPARATUS FOR USE IN MAKING ELECTRICAL INTERCONNECTIONS

[75] Inventors: Alan L. Kindig; Albert J. Wesseldyk, both of Holland, Mich.

[73] Assignee: General Electric Company, Fort Wayne, Ind.

[21] Appl. No.: 85,992

[22] Filed: Oct. 18, 1979

[51] Int. Cl.$^3$ .......... H02K 15/00

[52] U.S. Cl. .......... 29/596; 29/701; 29/720; 29/736; 29/753; 72/7; 72/441

[58] Field of Search .......... 29/596, 732, 736, 753, 29/720, 701, 702, 707; 72/7, 441; 318/569, 591, 601

[56] References Cited

U.S. PATENT DOCUMENTS

| | | | |
|---|---|---|---|
| Re. 30,001 | 5/1979 | Kindig | 29/596 |
| 3,962,780 | 6/1976 | Kindig | 29/596 |
| 4,035,910 | 7/1977 | Kindig | 29/753 X |
| 4,051,594 | 10/1977 | Kindig | 29/596 |
| 4,148,137 | 4/1979 | Kindig | 29/732 |

*Primary Examiner*—Carl E. Hall
*Attorney, Agent, or Firm*—Ralph E. Krisher, Jr.

[57] ABSTRACT

Method involves programming crimp connection equipment to automatically and sequentially establish a plurality of desired different connection configurations. Information representing a series of desired connection configurations is transferred to a control means. Such information is carried by a card that also illustrates a desired final stator assembly configuration. An operator sets thumb wheel switches so that digital information on the card is entered into a control panel. The control means automatically sequences and conditions the apparatus to establish different connections. The card both directly controls machine operation and also is used as a process control card. Also disclosed is a means for positioning a crimp height controlling eccentric shaft in virtually an infinite number of different predetermined angular positions and virtually continuously monitoring the actual instantaneous position of such shaft. In addition, a universal wheelfeed for feeding a connector strip and selectively replaceable means for guiding such strip are disclosed.

11 Claims, 15 Drawing Figures

METHODS AND APPARATUS FOR USE IN MAKING ELECTRICAL INTERCONNECTIONS

CROSS REFERENCE TO RELATED APPLICATION AND PATENTS

This application contains subject matter generally related to the subject matter of an application filed on the same day as this application in the joint names of Eugene C. Bair and Willard C. Hopkins, Ser. No. 86,000, and assigned to the same assignee as this application. Five Alan L. Kindig patents assigned to the General Electric Company (also the assignee of this application), also disclose subject matter related (in general) to the subject matter contained in this application. The identities of these five issued Kindig patents are as follows: U.S. Pat. No. 3,962,780 of June 15, 1976; 4,035,910 of July 19, 1977; 4,051,594 of Oct. 4, 1977; 4,148,137 of Apr. 10, 1979; and U.S. Pat. No. Re. 30,001 of May 22, 1979.

The entire disclosures of all of the just identified five Kindig patents and the entire disclosure of the above identified Bair and Hopkins application are specifically incorporated herein by reference.

BACKGROUND OF THE INVENTION

The present invention relates generally to apparatus and methods for use in making electrical interconnections and, more particularly, to such apparatus and methods that are utilized in conjunction with making crimped connections involving at least one magnet wire lead of an inductive device such as a dynamoelectric machine.

The above referenced Kindig patents point out, inter alia, the desirability of utilizing crimped connections in connection with the manufacture of motors and those patents particularly emphasize the difficulties and problems associated with making long lived reliable connections for motors that are to be used in hermetically sealed refrigerating compressor applications. In the motor art, stator assemblies so utilized are frequently simply referred to as "hermetic motors" although technically a complete motor would of course additionally include a rotor, shaft, bearings, housing, end frames, etc.

The above referenced Kindig patents also point out the difficulties in making high quality, long lived crimped or "splice" connections involving aluminum winding material in stator assemblies.

While the above referenced Kindig patents represent a substantial advancement over the state of the art as it existed prior to the Kindig inventions; it would now be desirable to make improvements both in the apparatus and methods taught by Kindig.

For example, it would be desirable to provide new and improved apparatus utilizing substantially less steel or other materials in the construction of such equipment without sacrificing the strength and reliability of such apparatus.

A review of the above mentioned Kindig patents will reveal the use of a toggle linkage supported on an eccentric shaft, with the position of the eccentric shaft being adjustable in order to change the height of a crimped connector "splice". While the apparatus illustrated in the above referenced Kindig patents was capable of being set up so as to make crimp heights of any desired value within the predetermined range or limits of the equipment; once the equipment was in fact set up for operation, it was capable of automatically making only two different crimped connector heights. Thus, it would be desirable to provide improved apparatus and methods whereby virtually an infinite number (within the two limits or range of the machine) of crimp heights may be automatically produced without requiring intervening manual set ups of the equipment.

The above referenced Kindig patents also illustrate a pawl type feed wherein a reciprocating pawl is engagable with splices or connectors so as to advance such connectors along a relatively long track and to the crimping station. When the type of feeding mechanism shown in the Kindig patents is utilized, it becomes relatively difficult and expensive to modify or set up the equipment for handling differently sized connectors (splices). Furthermore, it has been necessary to have "set-up" specialists prepare the prior art equipment for use with different stator models. Accordingly, it would be desirable to provide new and improved apparatus and methods whereby differently sized connectors (splices) may be automatically fed to a crimp station while minimizing the number of parts (and the expense of such parts) that must be interchanged in the equipment because of such change in connectors. It would also be desirable to provide new and improved methods and apparatus such that equipment could be "set-up" for different stator models without requiring the time and attention of "set-up" specialist.

The above referenced Kindig patents also disclose a method by which crimp connector equipment may be mechanically programmed in order to automatically establish a desired connector configuration (i.e. with or without a stuffer wire segment, and with a desired final crimp height). It would, however, be desirable to provide new and improved apparatus and methods whereby an operator could simply utilize an identity card, label, or other information bearing medium to automatically program this type of equipment.

Accordingly, a general object of the present invention is to provide new and improved methods and apparatus for providing the various desirable attributes or improvements mentioned hereinabove; and for solving the various problems mentioned hereinabove.

Another general object of the present invention to provide methods and apparatus wherein an information carrying medium other than a stator assembly per se is utilized while programming crimp connector apparatus and so that the apparatus will be automatically operative to provide crimped connectors of desired heights and with or without stuffer wires as desired.

It is another object of the present invention to provide improved methods and apparatus wherein automatic means for infinitely varying the angular position of an eccentric shaft in a toggle linkage crimping machine may be provided.

Yet another object of the present invention is to provide improved apparatus and methods for feeding interconnected splice connectors to a crimping station.

Still another object of the present invention is to provide new and improved methods and apparatus whereby a relatively compact and comparatively inexpensive and yet mechanically rigid and strong crimping machine is provided.

A further object of the present invention is to provide new and improved methods and apparatus wherein the angular position of a crimp height determining eccentric shaft is monitored, and wherein a signal indicative of the angular position of such shaft is fed back to a control means.

A still further object of the present invention is to provide new and improved methods and apparatus whereby a crimp connection machine operator can easily and quickly personally condition or "set-up" such machine for use with different stator models without requiring the services of a "set-up" specialist.

SUMMARY OF THE INVENTION

In carrying out the above and other objects of the invention in preferred forms thereof, methods are provided that involve programming crimp connection equipment so that it will automatically and sequentially establish a plurality of desired different connection configurations. One specific and preferred method involves transferring information representing a series of desired connection configurations to a control means for the equipment. Preferably, the information to be transferred is carried by indicia bearing means, such as a card and such card may also illustrate a desired final stator assembly configuration. In carrying out this particular method, the machine operator sets thumb wheel switches, or makes keyboard entries, etc. so that digital information appearing on the indicia bearing means is entered into the control means which may be, for example, a control panel. The operator may then also refer to the card and make crimped interconnections in the sequence directed by the card, with the control means automatically sequencing and conditioning the apparatus to establish the plurality of desired crimped connection configurations. When the card carries an illustration of the stator assembly, such illustration may either be relied upon or only occasionally referred to by the operator while making different connections.

In even more preferred forms, the previously mentioned card directly controls machine operation in addition to being used as a process control card and reference by the operator who acts in response to indicia appearing thereon. More specifically, and by way of example, at least some information carried by the card will interact directly with the control means in order to limit the number of automatic sequential crimping steps for any given stator assembly, or in order to mandatorily condition the control means and apparatus so that specific ones of the interconnections will include "stuffer" or "filler" wire segments. By following this approach, the indicia bearing means and control means may be utilized as a type of quality control or operator performance auditing means. For example, if the indicia bearing means indicates that the operator should set three thumbwheel switch sets so that three connections may be sequentially made per stator; and the indicia bearing means also carries information that directly interacts with the control means (without operator intervention) to demand the completion of three sequential connections; operator error in the form of setting either more or less than three thumbwheel switch sets can be readily detected, all as discussed in more detail hereinbelow in conjunction with the description of preferred embodiments of the invention.

In accordance with other aspects of the present invention, we provide methods that include positioning a crimp height controlling eccentric shaft in virtually an infinite number of different predetermined angular or rotational positions and virtually continuously monitoring the actual instantaneous position of such shaft in order to ensure that the actual shaft position corresponds to any given desired predetermined position. Moreover, we provide means for carrying out the just mentioned steps in the form of shaft moving means and shaft position sensing or indicating means.

In carrying out still other objects of our invention, in preferred forms thereof, we provide improved method of feeding an essentially continuous strip of connectors along a curvilinear path and into a crimping station; and new and improved universal wheelfeed means for so feeding the connector strip, as well as selectively replaceable means for guiding such strip between the wheelfeed means and the crimping station.

BRIEF DESCRIPTION OF THE DRAWINGS

The subject matter which we regard as our invention is particularly pointed out and distinctly claimed in the concluding portion of this specification. Our invention itself, however, both as to it's organization and method of operation, together with further objects and advantages thereof, may best be understood by reference to the following description taken in connection with the accompanying drawings wherein:

DESCRIPTION OF THE PREFERRED EMBODIMENTS

Figure 1:
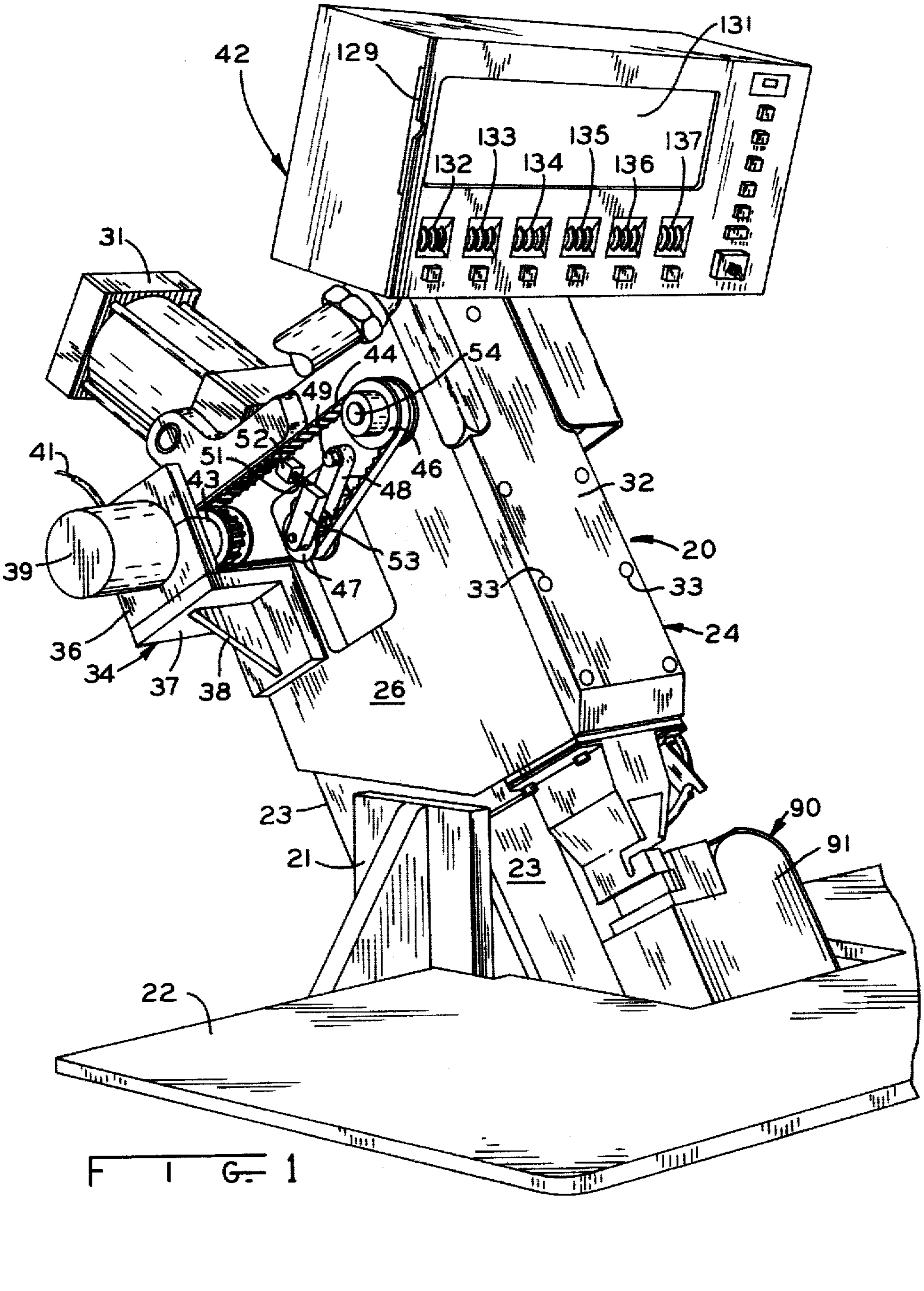
FIG. 1 is a front perspective view, with parts removed and parts broken away, of apparatus that embodies the present invention in preferred forms thereof, and which may be utilized when practicing the invention in another form thereof.

With reference now to FIG. 1, we have illustrated new and improved apparatus, generally denoted by the reference numeral 20, which may be utilized to carry out and practice our inventions in preferred forms thereof.

Figure 10:
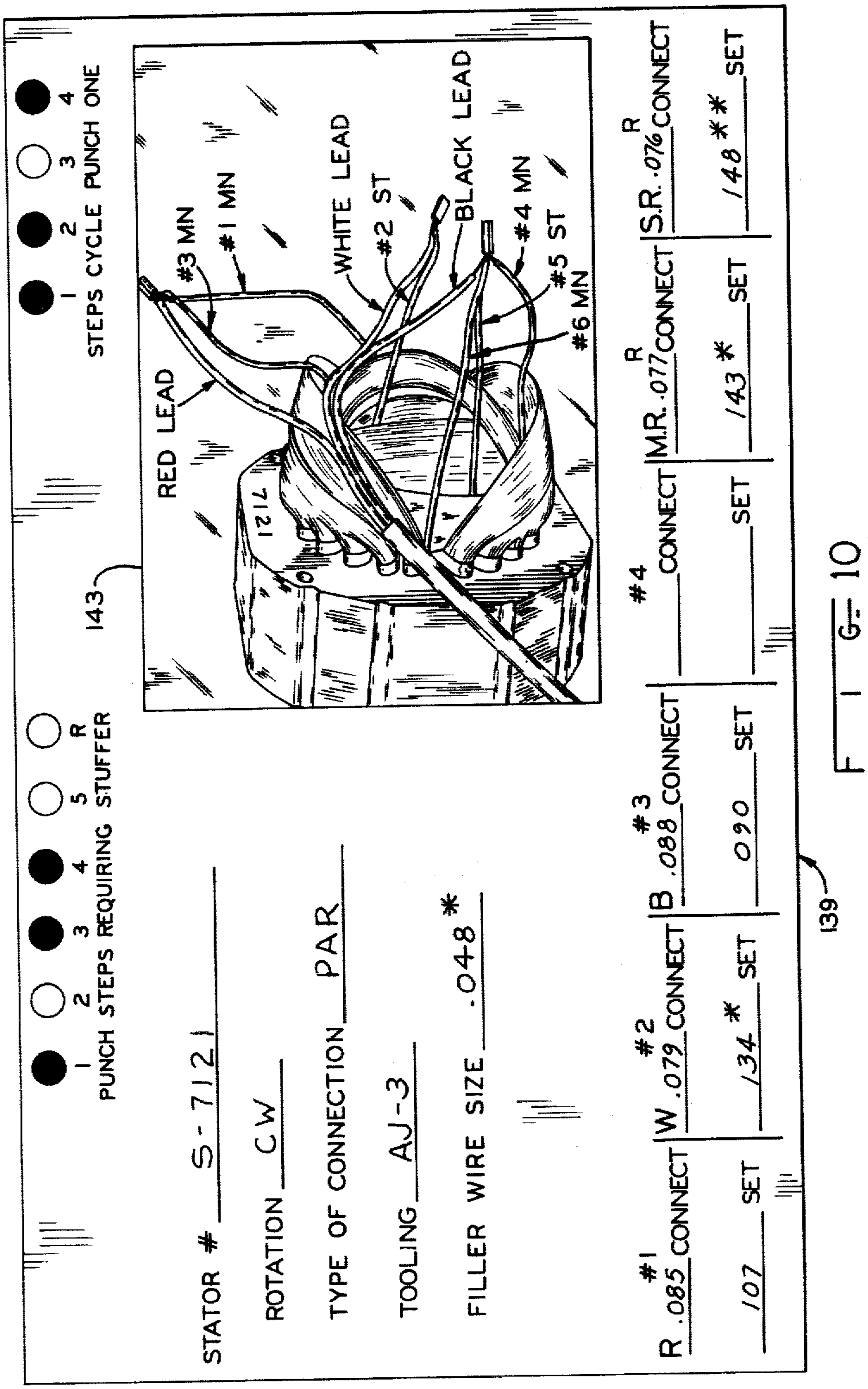
FIG. 10 is a view of a process control card of a type that may be utilized when practicing the same aspects of the invention.

With reference for a moment to FIG. 10, it will be appreciated that a stator assembly is there depicted which includes a magnetic core and excitation windings (both start and main windings). Furthermore, the stator assembly of FIG. 10 includes four main winding leads denoted by the reference characters #1MN, #3MN, #4MN and #6MN. In addition, the stator assembly includes two start winding leads denoted by the reference characters #2ST and #5ST. The particular stator assembly illustrated in FIG. 10 has the winding leads thereof interconnected with three lead wires denoted by the legends RED LEAD, WHITE LEAD, and BLACK LEAD. It will be noted from reference to FIG. 10 that the red, white and black leads are interconnected with selected ones of the stator assembly winding leads with what are known in the art as "splice" or "crimped" connectors.

It is known in the art that such connectors, after crimping to establish an electrical interconnection, must have a predetermined interconnection configuration in order to provide a satisfactory product. As is understood by persons skilled in the art, one interconnection may be configured differently from another interconnection because of the presence or absence of a so-called "stuffer" or "filler" wire; because of the presence of different numbers of winding leads; because the size of the wire making up the winding leads is different depending upon whether the lead is from a start winding (typically being a relatively small gauge wire) or from a main winding (being typically made of a comparatively larger gauge wire); or depending upon whether the main or start winding is made from copper material, aluminum material, or an alloy. Moreover, the external lead cables that are utilized may, from time to time, be of different sizes. Since all of this is discussed in the art (for example see sheet 5 of the drawings in the above referenced Kindig U.S. Pat. No. 3,962,780 of June 15, 1976, and corresponding description), it is not believed to be either necessary or desirable to continue this particular discussion herein except for the purpose of noting that substantial time and effort must be expended in order to insure that each winding interconnection corresponds precisely to a predetermined and prespecified configuration.

Before leaving FIG. 10, it is to be understood that the stator assembly there illustrated is presented only for purposes of discussion and teaching, and that the number of leads extending from a given stator assembly may be more or less than those shown herein. Moreover, and as will be understood from a description presented hereinbelow, in the event that a turn or loop of wire has been inadvertently broken, the broken ends thereof may be pulled out externally of the stator assembly and interconnected in order to effect a repair of the stator assembly winding.

Turning back now to FIG. 1, it will be understood that the apparatus 20 is actually supported by a welded mounting bracket 21, which may sit on a floor, table, or any other suitable means. The bracket 21 also supports a table top or work surface 22. Bolted to the mounting bracket 21 is a structural member that forms the main frame or "back bone" 23 of the apparatus 20. In one specific reduction to practice of the invention, the back bone 23 was made from a 3" (76.2 millimeters) thick piece of boiler plate that was 14" (35.56 centimeters) long and $9\frac{3}{4}$" (24.77 millimeters) wide. Fastened to the back bone by not shown screws are a left hand side plate 26 (see FIG. 2) and a right hand side plate 24.

Figure 3:
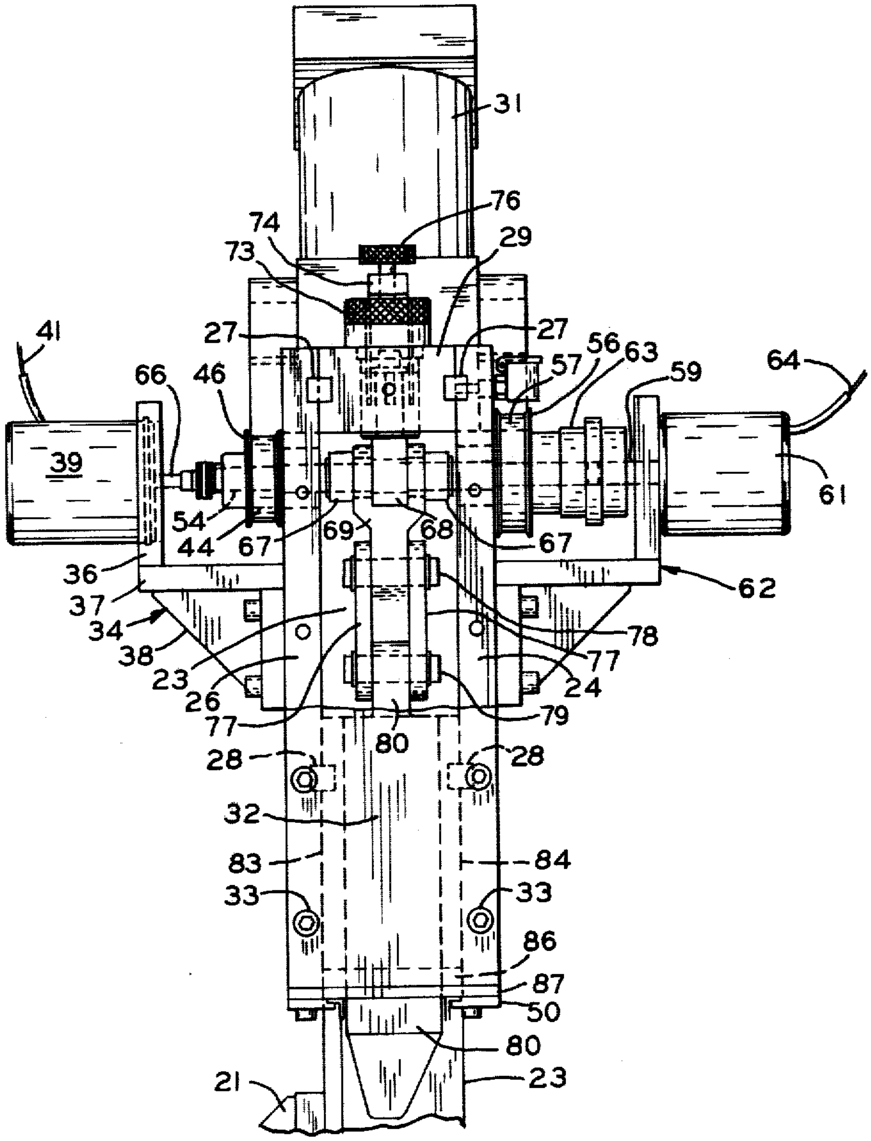
FIG. 3 is a view taken in the direction of the arrows 3—3 in FIG. 2.

With reference for a moment to FIG. 3, it will be noted that a pair of upper keys 27 and pair of lower keys 28 are trapped in key ways that are formed in the back bone 23, top plate 29, and the side plates 24, 26. The keys 27, 28 are relatively large and thus prevent the screws or bolts which hold the side plates 24, 26 to the back bone 23 and top plate 29, from being sheared during operation of the apparatus. As will be understood from the description presented hereinbelow, forces applied to the side plates 24, 26 during operation of the apparatus would tend to shear such fastening bolts or screws, and these shearing forces are carried by the keys 27, 28 so that tensile forces applied to the side frames or plates 24, 26 and top plate 29 are carried by the keys.

In the particular embodiment of the invention illustrated herein, all of the keys 27, 28 were made from oil hardened steel stock that was $\frac{1}{2}$" wide×$\frac{1}{2}$" thick (12.7 millimeters×12.7 millimeters); however, because of the different spacing available, the length of the keys 27 was only $3\frac{1}{4}$" (82.55 millimeters) while the length of the keys 28 was 7" (17.78 centimeters).

The aforementioned shearing forces are caused by the action of a cylinder 31 (which was a Hydro-Line air cylinder-series LR 2 having a $3\frac{1}{4}$" bore-$3\frac{1}{2}$" stroke, trunnion mount style U, 1" rod diameter, style 2 rod end and cushion cap end) that is supported by a trunnion from the top plate 29. Thus, any force applied by the cylinder 31 tending to move the top plate 29 relative to the side plates are transmitted through the upper keys 27 to the left and right hand side plates 24, 26 and thence through the lower keys 28 to the back bone 23.

With reference now once again to FIG. 1, a front plate 32 is fastened by screws to the left hand and right hand side plates 24, 26. Since the front plate 32 is not relied upon to transmit large forces during operation of the apparatus, keys are not required for force transmission purposes, and the just mentioned not shown screws are sufficient to insure the structural integrity of the fastening arrangement between the front plate 32 and the side plates.

With continuing reference to FIG. 1, it will be seen that a welded assembly 34 consisting of a mounting plate 36, angle support 37 and brace 38 have been illustrated as being fastened to the side plate 26. This assembly may be fastened to the side plate 26 by welding but preferably is assembled to the side plate by means of not shown bolts. The purpose of the welded assembly 34 is to support a shaft position encoder 39 which is utilized for purposes described hereinbelow. At the present time, it is merely noted that the encoder 39 may conveniently be a Baldwin shaft position encoder Model 5V-5B-2 and that the leads 41 thereof would be connected with the control means that have been generally denoted by the reference numeral 42. Mounted on the shaft of the encoder 39 is a timing belt sprocket 43 and wreathed about such sprocket is a timing belt 44, which is drivingly inter-engaged by a timing belt sprocket 46. Tension is maintained on the belt 44 by means of an idler arm sprocket 47 carried by an idler arm 48, which is pivotally mounted to the side plate 26 by a pivot pin 49.

A compression spring 52 trapped between a spring retainer 52 (carried by the side plate 26) and a spring retainer 53 (forming part of the idler arm assembly) insures that sufficient tension is applied to the belt 44 that slippage will not take place between the sprockets 43, 46 and belt 44. It will be noted that the sprocket 46 is locked onto shaft 54 which shaft passes through elongated slots in side plates 24, 26. The shaft 54 extends all of the way through the apparatus as best revealed in FIG. 3.

With continuing reference now to FIG. 3, it will be seen that the shaft 54 carries a timing belt sprocket 56 on the end thereof opposite the end carrying the sprocket 46; and a timing belt 57 is drivingly engaged with the sprocket 56.

Referring back to FIG. 2, it will be seen that the timing belt 57 is driven by a timing belt sprocket 58, which is driven from the shaft 59 of a stepper motor 61. The motor 61, and various parts of the drive arrangement associated therewith will now be described with reference once again to FIG. 3.

Turning back to FIG. 3, it is initially noted that tension may be maintained on the timing belt 57 with an idler arm assembly virtually identical to the parts 47–49 and 51–53 described hereinabove and which have been omitted from the drawings herein in order to promote clarity of illustration of the other parts that have been shown. The motor 61 in the embodiment illustrated herein was a SLO-SYN Stepping Motor # M111-FD12 and it was supported from side plate 24 by a welded assembly 62 which was substantially the same as the welded assembly 34. A flexible coupling 63 (which may be a "BOST-FLEX" coupling #11730 with an insert #11722) was used to couple the shaft 59 of the motor 61 with the previously mentioned timing belt sprocket 58. Thus, when pulses are supplied from the previously mentioned control means to the leads 64 of the motor 61, the shaft 59 advances in pulsed increments in order to drive the timing belt 57, sprocket 56, and ultimately shaft 54. The particular motor chosen as motor 61 was one which advanced 1.8° for every pulsed input. However, the diameter ratio selected for the sprockets 58 and 56 was 2:1 so that the shaft 54 actually rotated only 0.9° for every pulse applied to the motor 61. The diameter ratio of the sprockets 46 and 43 (see FIG. 1) was 1:1, however, and so a given amount of angular rotation or displacement of shaft 54 would result in the same amount of rotation or angular displacement of the shaft 66 of the encoder 39.

It will be appreciated from a review of FIG. 3 that the encoder shaft 66 is coupled with its timing belt sprocket by means of any suitable coupling which may, for example, be a NAUGLER coupling (Series ¾ Type "F" ) bored to accept a stub shaft carrying the timing belt sprocket and also bored to accept the encoder shaft 66.

It now should be appreciated that driving pulses applied to the motor 61 will cause it to rotate until the driving pulses are removed therefrom. Rotation of the motor shaft 59 in turn will cause rotation of the shaft 54 and the encoder shaft 66. As discussed in detail in the aforementioned copending Bair and Hopkins Application Ser. No. 86,000 the exact position of shaft 54 is always determinable by means of the encoder 39 and once the shaft 54 starts to rotate from a "home" position, the signal supplied to the control means by the encoder are utilized to stop the stepper motor 61 when the shaft 54 has rotated to a precise, predetermined desired angular position relative to the stationary portions of the apparatus.

As best revealed in FIG. 3, bushings 67 (formed of oil hardened steel) having a round bore therethrough are supported on the shaft 54 and round, reduced diameter portions of the bushings 67 are disposed within round holes formed in the crank arm 13. Thus, the precise vertical location of the shaft 54 will determine the precise vertical location of the center of the bushings 67 and the center of the holes in the crank arm 13 which are supported by the reduced diameter portions of the bushing 67. The shaft 54 itself, however, is supported by the round bore of a pivot eye 68. However, the round central portion of the shaft 54 (i.e., the portion carried by the pivot eye 68) is ground on the shaft so that it is eccentric relative to the remainder of the shaft. Thus, when shaft 54 rotates, and pivot eye 68 remains stationary, "the throw" or eccentricity between the central portion of the shaft 54 (i.e. that part carried in the pivot eye 68 and the remainder of the shaft 54) will cause the bushings 67 to move in an eccentric orbit relative to the true center line passing through the pivot eye 68. The movement of the bushing 67 in an eccentric orbit relative to the pivot eye 68 in turn will cause a corresponding movement by the crank arm 69. Thus, rotation of shaft 54 will cause the crank arm to move upwardly or downwardly as viewed in FIG. 3.

It now should be understood that during one complete revolution of the shaft 54, the bushing 67 (and the crank arm 69) will undergo an upward and downward movement equal to the two times the relative eccentricity or "throw" of the central eccentric portion of shaft 54 and the center line of the remainder of shaft 54. In the apparatus illustrated herein, the shaft 54 was ground to have a central portion having an eccentricity of 0.015 of an inch; so one revolution of shaft 54 could cause an overall vertical movement of 0.03 inches (0.76 millimeter). It now also should be understood that rotation of shaft 54 in 0.9° increments under the influence of the stepper motor 61 will result in 400 separate distinct locations of the center of the crank arm 69 for each revolution.

While the above described controlled angular positioning of the eccentric shaft 54 will provide a wide range of crimp heights, it may, from time to time, be desirable to make adjustments in the relative height or position of the pivot eye 68. This is accomplished by turning an adjusting screw 71, which is, in reality, a sleeve having a smooth inner diameter and a threaded outer diameter. This sleeve or adjustment screw 71 is assembled with a rod portion of the pivot eye 68 by means of cap screw 72 and while relative axial movement between the adjustment screw 71 and pivot eye is prevented, the adjustment screw 71 is free to rotate on the pivot eye. The outer threaded portion of the adjustment screw is threadably carried by an internally threaded hole formed in the top plate 29 and rotation of the adjustment screw 71 relative to the top plate will cause the pivot eye 68 to move upwardly or downwardly, depending upon the direction in which adjustment screw 71 is turned. In order to facilitate turning of the adjustment screw 71, the sleeve from which the adjustment screw 71 is made is provided with a plurality of axially extending holes therein. Slidably and telescopically received within such holes are round pins that are carried by an adjustment knob 73 (shown in phantom in FIG. 3, but omitted from FIG. 2). Thus, the adjustment knob 73 (with its projecting pins) in reality acts as a spanner wrench type of tool which may be rotated in order to change the vertical location of adjustment screw 71 in the top plate 29.

The adjustment of adjusting screw 71 would take place relatively infrequently in most manufacturing operations and, in order to prevent inadvertent adjustment of the adjustment screw 71 by knob 73, means are provided for frictionally engaging adjustment knob 73 and prevent any inadvertent movement of the adjustment knob 73. The locking means utilized with the apparatus shown herein is in the form of a clamp bar 74 which is fastened by means of bolts to the top plate 29. The clamp bar in turn is provided with a threaded opening which accommodates the threaded portion of a locking screw 76. When the locking screw 76 is threaded downwardly to tightly trap the adjustment knob 73 against the top plate 29, rotation of the adjustment knob 73 is prevented and thus accidental movement of the adjustment knob 71 and corresponding vertical movement of the pivot eye 68 is avoided.

Figure 2:
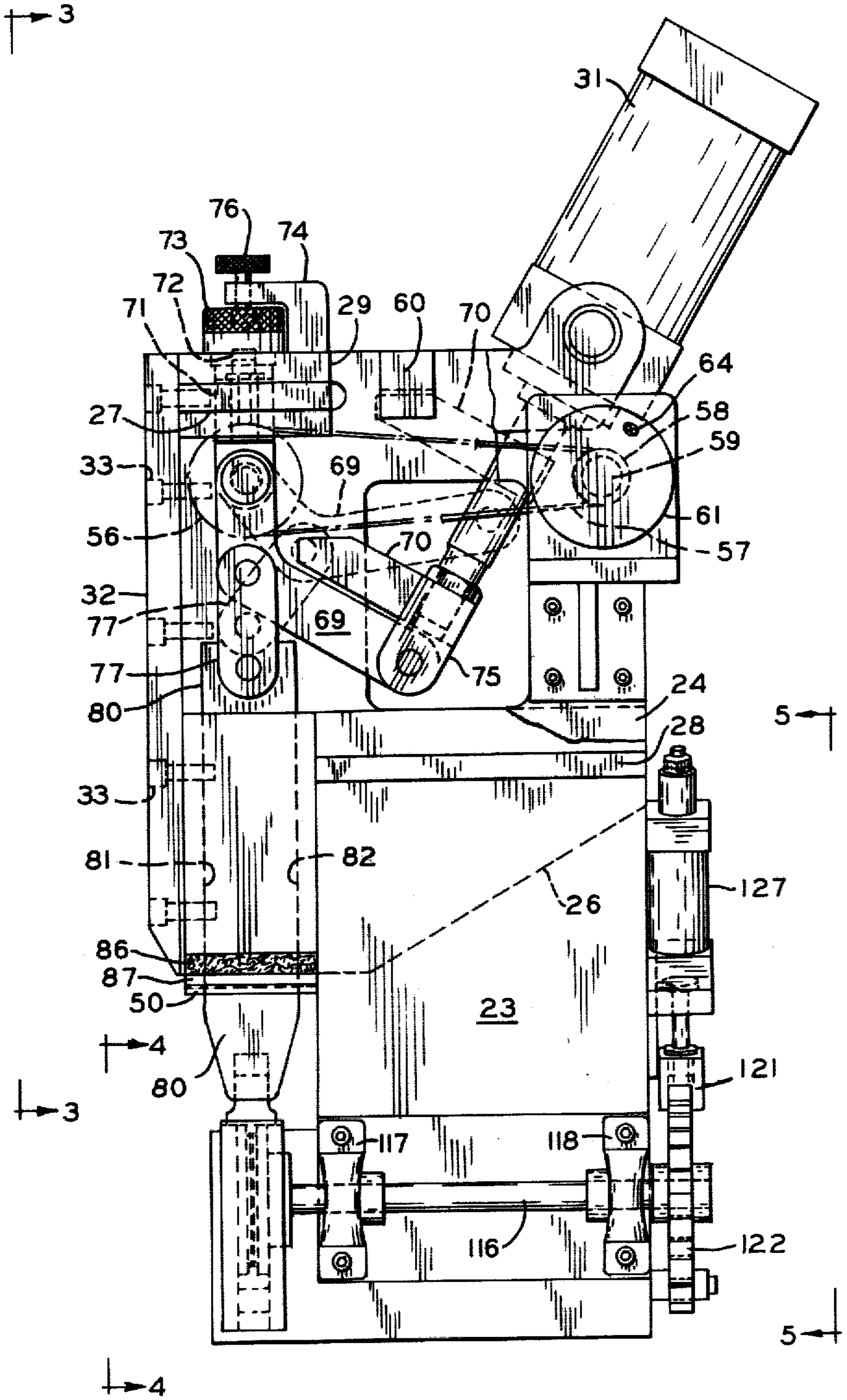
FIG. 2 is a side elevation, with parts removed and parts broken away, of the apparatus shown in FIG. 1.

With continued reference to FIG. 2, it will be noted that the crank arm 69 has been shown in both a retracted phantom position thereof and an advanced solid line position thereof. Similarly, pressure links 77 carried by link pin 78 (see FIG. 3) moves between solid and dotted line positions as shown in FIG. 2.

With reference to FIG. 3, the pressure links 77 are interconnected through a linkage pin 79 with a press ram 80 so that movement of the crank arm 69 will cause the press ram to move upwardly and downwardly relative to the frame of the apparatus.

With reference now to FIG. 2, the clevis 75 of the rod for cylinder 31, in addition to carrying the crank arm 69, also carries a metal flag 70, which, when raised to its uppermost position (corresponding to a fully retracted position of the cylinder rod), actuates a Dynaper pickup (type 58) 60. The Dynapar pickup 60 in turn provides a signal to the control means for the apparatus to indicate that the press ram is in a fully elevated position. Although a dynapar pickup has been illustrated as being used with the embodiment shown herein, it will be understood that any other proximity type detector, mechanical limit switch, or equivalent type of mechanism may be utilized in order to signal that the press ram has been fully raised.

The lower end of the press ram 80 carries conventional tooling that normally is purchased from the vendor chosen to supply the splice connectors. In specific reductions to practice of the chosen invention, tooling and connectors were of the ESSEX type although AMP tooling could be utilized in conjunction with splice connectors available from that same company under the trade name "AMPLIVAR" splices.

The press ram 80 was made from a piece of oil hardened steel 10-¼" long×2-¼" wide×2-¼" thick (26.04 centimeters×5.72 centimeters×5.72 centimeters). The press ram 80 was sandwiched between the right and left hand side plates, the front plate, and the back bone 23 of the apparatus. Bearing surfaces for the press ram are provided by LAMINA Wear Plates, Series FP-100, which are steel plates having a bronze surface. At the time of assembly, grease preferably is applied to the wear plates and occasionally grease may be added to the interface of the wear plates and the press ram, although lubrication of the press ram along the sliding wear plate surfaces is not of great importance due to the low speed and intermittent type of movement of the press ram 80 relative to the wear plates. The wear plates that were utilized have been denoted by the reference #81 through 84 in FIGS. 2 and 3. FIG. 3 (and FIG. 2) also reveals a felt ram seal 86 which is held in place by a seal retainer 87 and guard retainer 50. The felt seal 86 is used to prevent dripping of oil from the grease utilized for lubrication purposes between the press ram 80 and wear plates 81–84.

A new and improved wheel type of connector feeding mechanism will now be described with reference to FIGS. 1 and 4–9.

With initial reference to FIG. 1, the rotary or wheel feed mechanism for the apparatus 20 has been generally denoted by the reference numeral 90. It will be noted however, from FIG. 1, that a front cover 91 hides from view a substantial portion of the mechanism. Accordingly, reference is now made to FIGS. 2 and 4 which better reveal the connector or splice feeding mechanism. With specific reference to FIG. 4, which reveals only portions of the overall apparatus and from which the front cover 91 has been removed, it will be initially noted that a feed wheel 92 is supported adjacent to a feed track assembly 93 and die block 94. The feed track assembly 93 will be described in more detail hereinbelow, but it is noted in passing that the feed track assembly 93 is supported by being attached by means of screws 96 to the die block 94. It also is noted that a cover plate support 97 is fastened to the machine and utilized to support the removed front cover 91 and a rear cover plate 98. The front and rear cover plates 91, 98 support a tubular splice or connector guide 99, and the upper connector guide 92.

Both the tubular guide 99 and upper guide 92 are fastened by means of screws to the front and rear cover plates 91, 98. The upper connector guide 92 includes a generally arcuate portion 101 and a connector retainer tongue 102 (shown in phantom in FIG. 4). It will be noted that the end of the upper member 101 overlies a projecting nose or tongue 103 which forms part of the feed track assembly 93.

Figure 6:
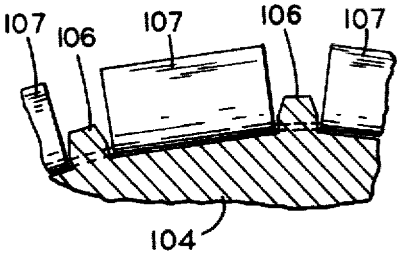
FIG. 6 is an enlarged view of a portion of a connector feed wheel that is revealed in phantom in FIG. 4.
Figure 7:
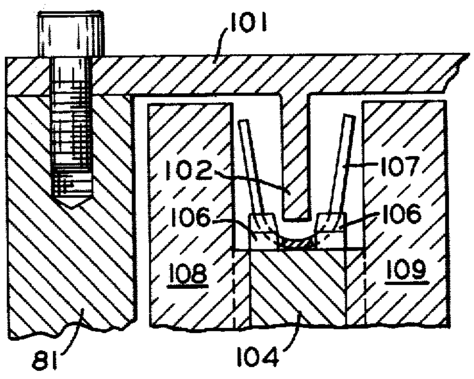
FIG. 7 is a cross-sectional veiw of a portion of the assembled feed wheel that is revealed in phantom in FIG. 4.

The feed wheel assembly 92 is a composite structure which will now be described in more detail while having reference to FIGS. 6 and 7. With initial reference to FIG. 7, it will be noted that the feed wheel is made up of a centrally disposed disk 104 having teeth 106 formed therein. The teeth 106 are arranged in laterally spaced apart pairs as shown in FIG. 7, and each pair of teeth are spaced circumferentially around the disc 104 as revealed in FIG. 6 (and in phantom in FIG. 4). Attached to the central disc 104 by means of bolts are side plates or discs 109, 108. These discs serve as retainers for splice connectors which are fed by the wheel assembly 92 toward the crimping station. Typical connectors and their relationship to the feedwheel assembly are illustrated in both FIGS. 6 and 7 and identified by the reference numeral 107. It thus now will be appreciated that the rotating wheel assembly meshes with the connected together splice connectors in order to advance them from the guide tube 99 and toward the track assembly 93 (as viewed in FIG. 4).

FIG. 7 also quickly reveals the relationship between the front cover plate 81, and the generally T-shaped retainer 102 and upper member 101. The retainer 102 holds the splice containers in close proximity to the teeth of the feeding mechanism so that slippage between the feed wheel and the connectors cannot take place. As the connectors leave the feedwheel assembly (as viewed in FIG. 4) and enter the guide track assembly 93, they are supported by the tongue or nose 103 of the assembly 93.

Figure 8:
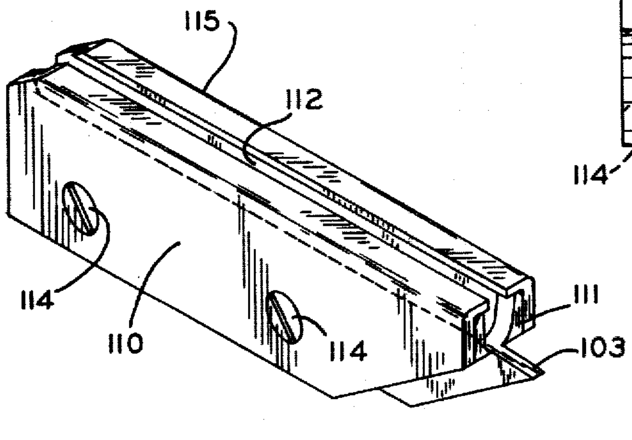
FIG. 8 is a perspective view of a feed track which is shown in FIG. 4 as extending from the exit of the feed wheel to a crimping station.
Figure 9:
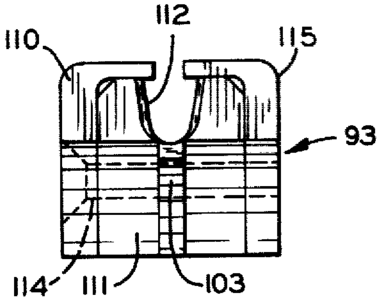
FIG. 9 is an end elevation of the track assembly shown in FIG. 8 when viewed generally toward the left in FIG. 8.

More details of assembly 93 will be understood by now referring to FIGS. 8 and 9. It will be noted from FIGS. 8 and 9 that assembly 93 includes a pair of side plates 110, 115 and a centrally disposed guide block 111 which is machined to provide a track way 112 for splice connectors. In addition, the nose or tongue 103 is machined from the guide block 111 so that the tongue or nose 103 is a unitary part with the guide block 111. The entire assembly 93 is held together by means of any suitable means which may be in the form of the illustrated screws 114.

Figure 4:
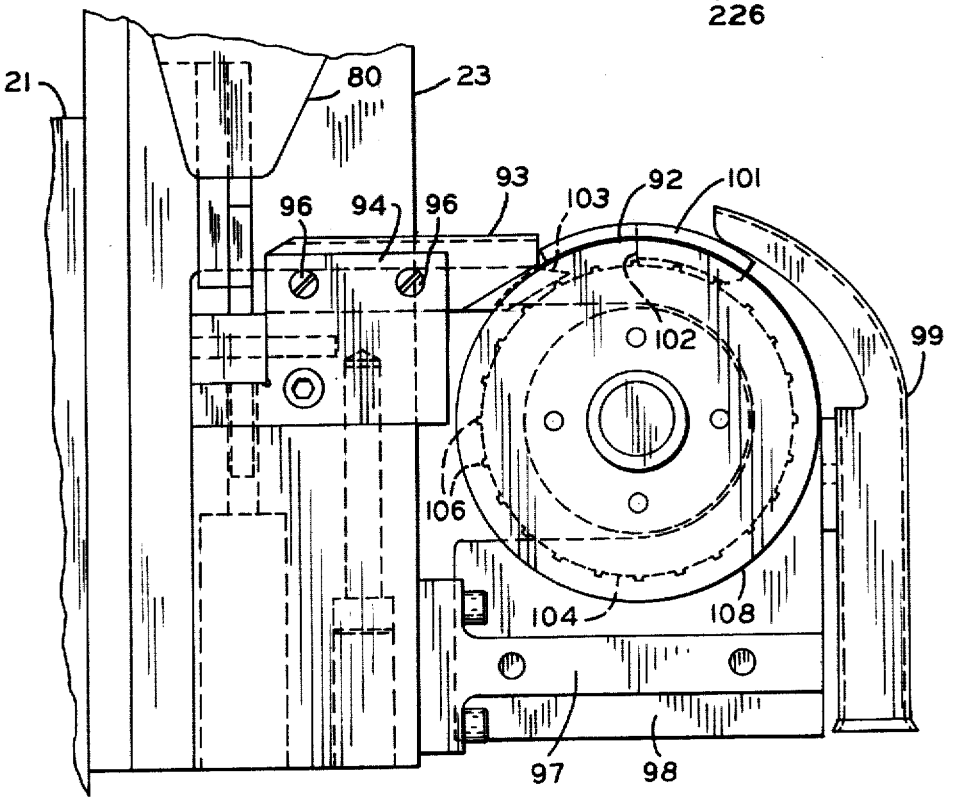
FIG. 4 is a view taken in the direction of the arrows 4—4 in FIG. 2.
Figure 5:
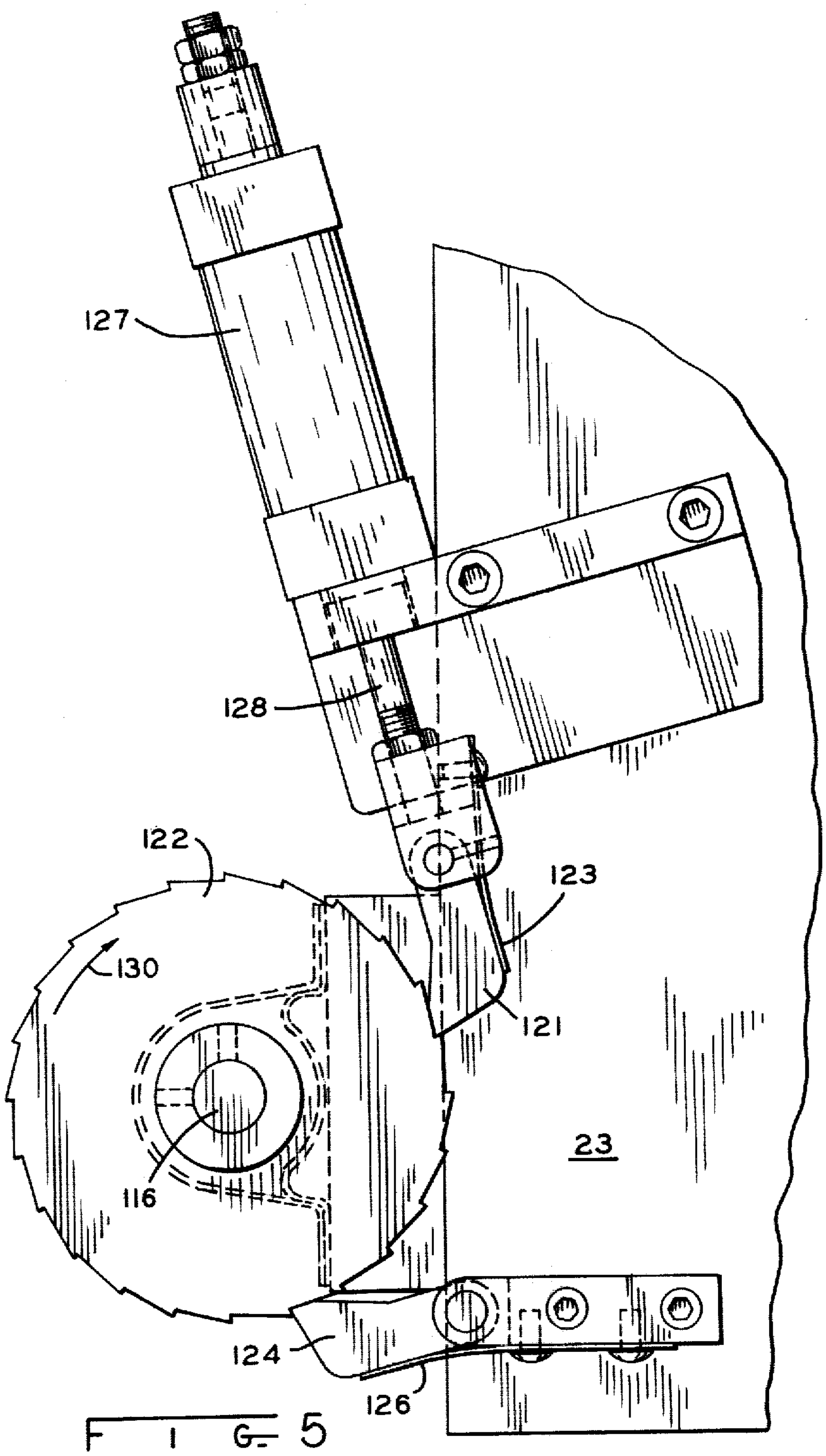
FIG. 5 is a view taken in the direction of the arrows 5—5 in FIG. 2.

The feedwheel 104 is carried by and supported by a shaft 116 (see FIGS. 4, 2, and 5). The shaft 116 in turn is supported by a pair of pillow block bearings 117, 118 which are fastened to the back bone 23 of the apparatus. Feedwheel assembly 92 then is indexed or advanced in incremental steps by means of the interengagement and interaction of a feed pawl 121 and index wheel 122.

With specific reference now to FIG. 5, it will be seen that the index wheel 122 is locked with the shaft 116 for rotation therewith, and that the feed pawl 121 is biased against teeth of the index wheel by a spring 123. Similarly, a locking pawl 124 is biased against teeth of the index wheel by a spring 126. The control means for the apparatus 20 actuates an appropriate valve in order to supply air to the air cylinder 127 whereupon the cylinder rod 128 is extended so that the pawl 121 will advance the index wheel 122 in the direction of arrow 130. As the index wheel is advanced, the locking pawl 124 will ride from one tooth into another and prevent reverse rotation of the index wheel.

After the cylinder 127 has advanced the rod thereof in order to advance the index wheel 122, the cylinder retracts the rod and the pawl 121 returns to its home position as will be understood by persons skilled in the art. The pawl 124 and the entire assembly composed of cylinder 127, pawl 121, etc. are mounted by means of screws to the backbone 23 of the apparatus as is clearly revealed by FIG. 5.

Although any type of actuating mechanism could be used to advance the index wheel 122, we have used a TINY-TIM air cylinder model DTSR having a 1⅛" bore, 1" stroke, and 5/16" diameter rod in preferred embodiments of our invention. It now should be understood that actuation of the cylinder 127 (best shown in FIGS. 5 and 2) will cause an indexing or advancing movement of the feedwheel 92 and a corresponding advancement of a splice connector or clip along the track assembly 93. It also should now be appreciated that changes can be made in the apparatus shown in the drawings in order to quickly accomodate different splice connectors simply by changing the feed track 93 as required so that the feed track utilized will have dimensions corresponding to the dimensions of the splice connector being used.

With joint reference now to FIGS. 1, 10, 11, and 12, operation of the apparatus 20 will be described in more detail. With reference to FIG. 1 it will be noted that the control means 42 is provided with an opening or slot 129, a window 131, and a series of thumbwheel switches 132–137. In addition, other switches and cycle lights are carried by the control 42. However, the above referenced Bair and Hopkins application (the entire disclosure of which has been incorporated herein by reference) describes the control apparatus 42 in complete detail. Accordingly, neither detailed illustrations nor specific description regarding apparatus control means 42 is repeated herein. However, it is noted that the indicia bearing means illustrated as a process control card 139 in FIG. 10 is normally inserted into the window 129 of the control means and the thumbwheel switches 132–137 are set to have readings which correspond with the information contained on the process control card.

More specifically, and with reference jointly to FIGS. 1 and 10, the three thumbwheel switches 132 are set so that the digital readouts associated therewith will correspond with the "SET" information contained for connection "#1" as revealed on card 139 in FIG. 10. Similarly, the switches 133, 134, 136, and 137 will be set so that the digital readouts associated therewith will correspond to the "SET" information corresponding to connection steps "#2", "#3", "#5", and "R" as shown on card 139 in FIG. 10.

When the apparatus 20 is to be utilized, a process control card such as the card 139 is inserted into the control means. At that time, some of the information stored by the card 139 acts directly upon the control means. More specifically, the card 139 shown in FIG. 10 would program the control means so that stuffer wire will be automatically provided by the apparatus for crimping steps 2, 5, and R as indicated by the holes punched in the card in the upper portion thereof. In addition, the control means will be automatically and immediately programmed so that only 3 crimping steps will be automatically performed. This number of steps is controlled by punching a hole at step number 3 in the upper right hand portion of the card 139 as viewed in FIG. 10.

Thus, the card 139 carries information which is directly readable by the control means (either by means of acturately positioned LED and phototransistor pairs or by means of switch contacts that can be made through the punched openings in the card. In addition, the card carries visual information which the operator refers to in setting the thumbwheel switches in order to complete the programming of the control means for the apparatus described in this application.

More specifically, the card 139 indicates that the RED LEAD connection "R", to be made as connection "#1" is to have a crimp height of 0.085 inches and that the height of the final crimp connector will have this dimension when thumbwheel switches 132 are "SET" to "107", and when the connection involves the "RED LEAD", "#3MN", and "#1MN" as denoted in the photographic illustration on card 139 of a typical stator Model 7121. Similarly, a connection involving the white lead (connection step "W", "#2" on the card) will have a crimp height of 0.79 inches when the thumbwheel switches 133 are "SET" to correspond to a setting of 134; and a stuffer of filler wire having a diameter of 0.048" is included in the interconnection. It will be noted that a stuffer wire automatically will be provided by the apparatus for connection "#2" since step number 2 at the top of the card 139 has been punched out.

It will be recalled that discussion was presented hereinabove concerning the repair of main and start windings. The process control card 139 also supplies information to the operation as to the settings that will be required in order to effect a repair on either a main winding segment or start winding segment of the stator model 7121 illustrated by the card. Thus, if the operator discovers a damaged or broken wire in the main windings, the operator can activate a button underneath the thumbwheel switches 136 which will instantaneously program the apparatus to establish a crimp connector height corresponding to the setting under step "#5" on the process control card number 139 (i.e., a height of 0.77"). In addition, the equipment will automatically provide a stuffer wire for the repair connection "MR" for the main winding. In the event that a start winding is to be repaired, the operator similarly merely has to activate a pushbutton switch immediately below the thumbwheel switches 137 (see FIG. 1) after they have been "SET" to 148 and the machine will automatically adjust itself to establish a crimp height connection of 0.076" (see the start/repair instructions in FIG. 10), and the apparatus will also automatically provide a segment of stuffer wire. It should be noted that for the start repair step, a double asterisk appears beside the number 148 on the "SET" line in FIG 10. The presence of the double asterisk indicates to the operator that a double segment of stuffer wire will be required to effect a proper repair connection. Thus, the operator merely has to manually hold an extra piece of stuffer wire in the tooling of the apparatus while the operator actuates a footpedal switch which causes the apparatus to make the selected repair connection.

It is believed that the foregoing description is sufficient to permit a person skilled in the art to understand how to carry out our invention and our preferred mode of practicing the invention. However, in the interest of clarity, the process control card 139 and its utilization will now once again be described using different terminology and referencing different sections and parts of the card.

Along the top of the card 139 a series of black spots would initially appear thereon. A production planner then would select a specific stator model such as stator model 7121 and apply a typical photograph of such a stator to the card with the photograph appearing substantially as is revealed in the box 143 in FIG. 10. The planner then would also enter the stator model in the appropriate blank on the first line of the card labeled "STATOR #"; and enter pertinent information concerning the stator, for example, enter "CW" to indicate that the stator was to have a clockwise rotation, enter "PAR" on "TYPE OF CONNECTION" line to indicate that the windings of the motor are to be parallel connected, enter "AJ-3" on the "TOOLING" line of the card to indicate that tooling designated as AJ-3 was to be used in making the connections for stator model 7121 (this also would indicate that connector types AJ-3 were to be used), and enter the size in inches of the size of filler wire that should be used as a stuffer for connections made for a stator model 7121.

Thereafter, the planner would refer to the lines along the bottom of the card and enter the appropriate information needed for each lead and repair connection. Thus, he would enter the height of a final crimp connection that would be needed in order to establish a desired high quality connection for each of those leads indicated in the photograph on the card as involving the red, white, or black leads; as well as for those needed for repair operations of either a main winding segment or a start winding segment. In performing this task, the planner would refer to information available from suppliers of crimp connectors to determine the desired crimp height when a given amount or volume of wire (including, when needed, stuffer wire) is included within the crimp connector. Thereupon, the planner would enter the actual desired connector height for the various connection steps. In the case of the card 139, this information indicates that: the connection involving the red lead i.e., "R" connection or step "#1" should have a final crimp height of "0.085"; the connection "#2" involving the white lead (represented by "W") would have a final crimp height of "0.079", etc. After the card 139 has been completed to this point, the planner then can refer to charts made up for different types of tooling which interelates thumbwheel settings on the control means with final crimp height.

Figure 12:
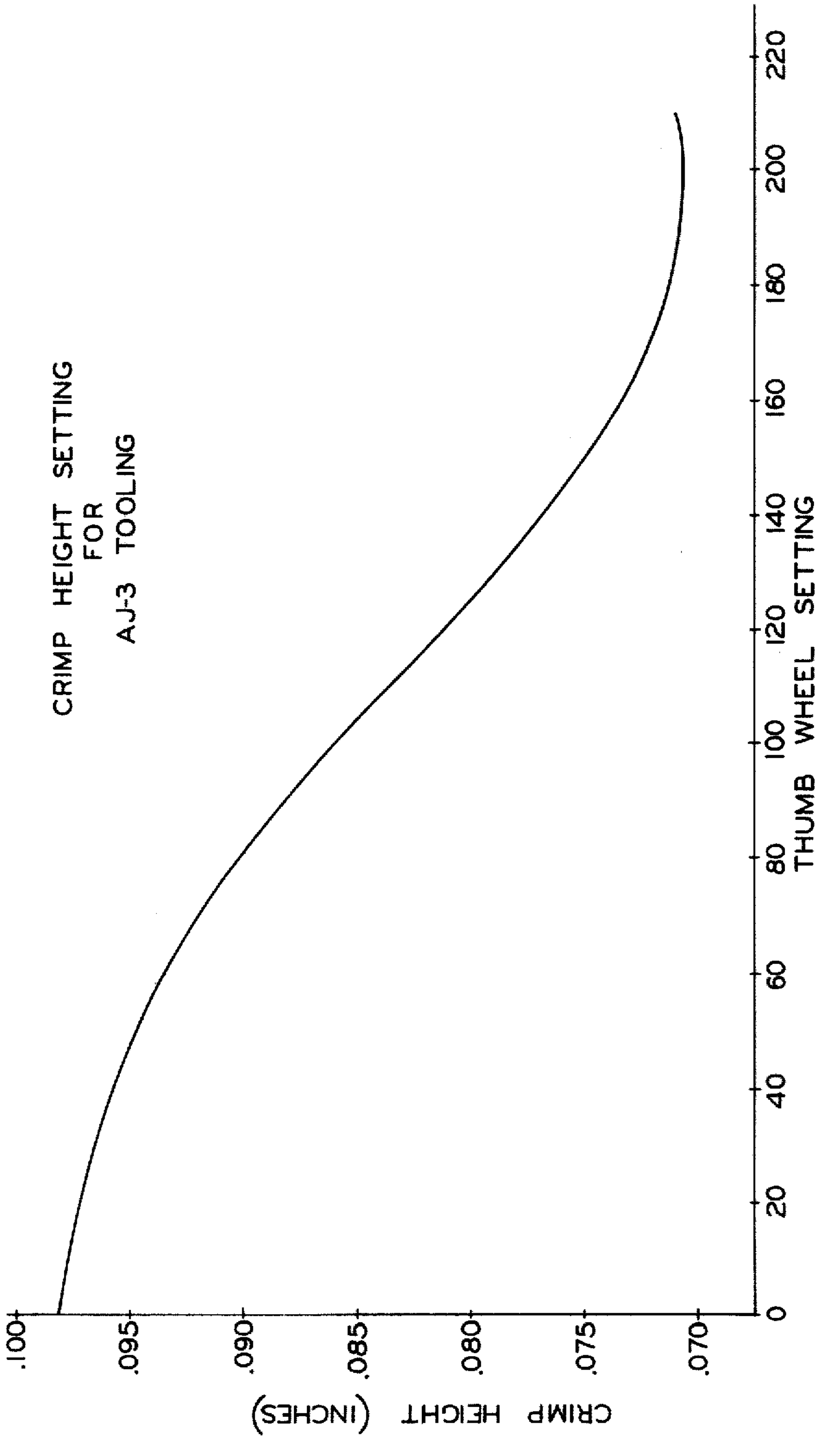
FIG. 12 is a graph corresponding to FIG. 11 except that the graph of FIG. 12 is pertinent to a second set of crimping tooling.

For example, and with reference to FIG. 12 which shows a correlation between crimp height in inches and thumbwheel settings for AJ-3 tooling, the planner would make reference to the red connection required by card 139 (see FIG. 10) and note that for a desired crimp height of "0.085", the thumbwheels should be set at approximately 107. Thus, the planner would enter "107" on the "SET" line for connection "#1" on card 139.

Figure 11:
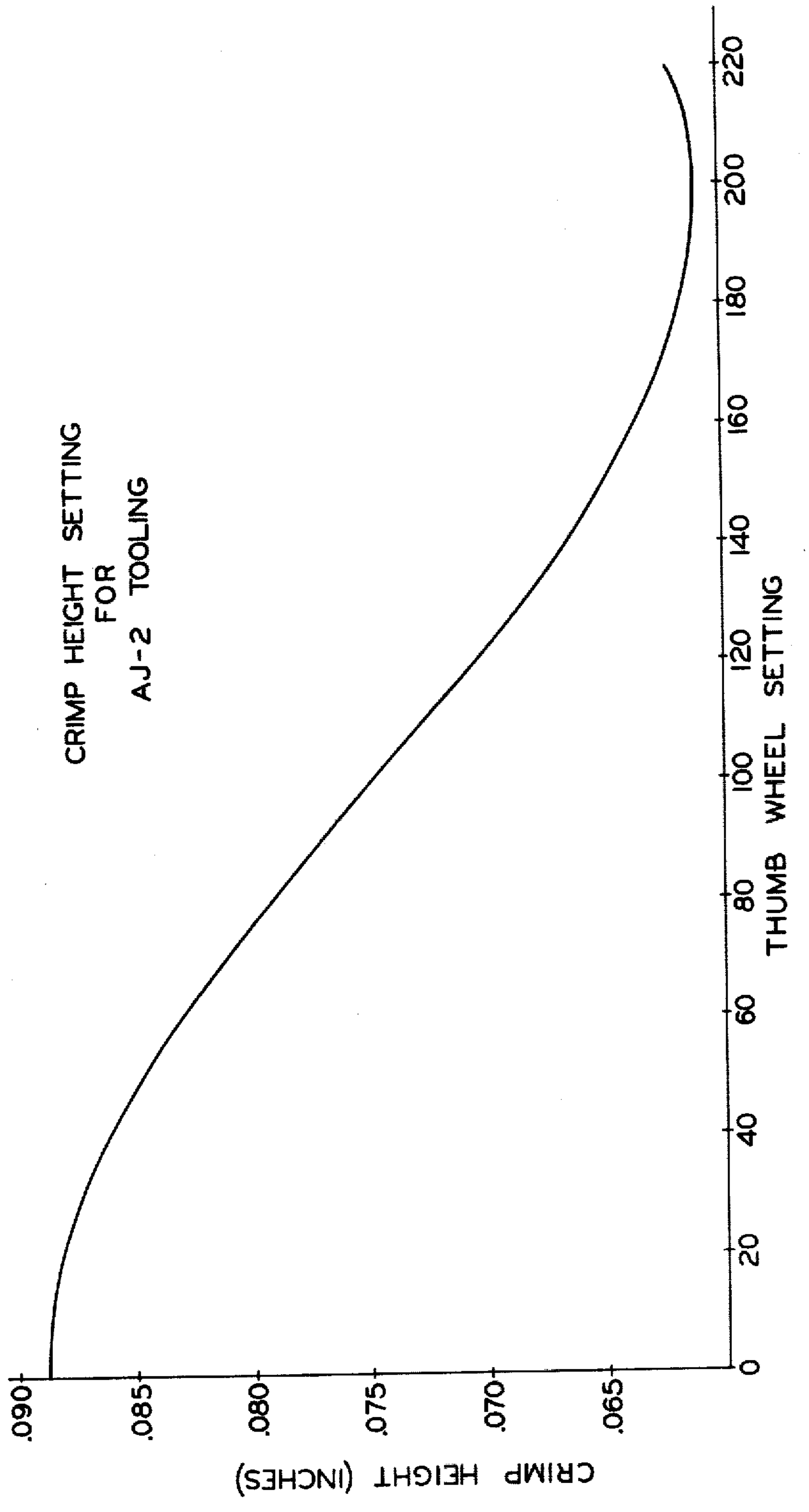
FIG. 11 is a graph representing the relationship between actual crimp height and input numerical control values used in the operation of the apparatus shown in FIG. 1 when a first set of crimping tooling is provided in the apparatus of FIG. 1.

It now should be understood that FIGS. 11 and 12 show correlations between final actual crimp height and thumbwheel settings for the control means illustrated in FIG. 1. However, it should also be understood that although FIGS. 11 and 12 are actual representations of graphs or curves that we have found to be useful with the apparatus illustrated herein, accurate curves on convenient to read graph paper would actually be used in practice.

With continued reference now to FIG. 10, it will be understood that the process control card 139 provides a graphic illustration showing an operator what wires should be connected together with the red lead (i.e., number 1 main or "#1MN", and number 3 main). In making this connection, the operator merely selects a red lead wire and places it with, the number 1 and number 3 main winding leads in the tooling of the apparatus. Thereupon, the operator presses a foot pedal. The apparatus automatically adjusts the rotational position of the eccentric shaft which determines the height of the final crimp and a crimp having the final desired configuration (i.e. height, conductors and stuffer wire if needed) will be provided. This all may be accomplished simply by an operator placing a process control card such as the card 139 into the control means for the apparatus and setting thumbwheel switches to correspond to the instructions carried by the process control card.

The wire stuffer feed which feeds a stuffer wire into the top of a splice connector from the guide tube 200 (best seen in FIG. 1) will now be described. In the interest of promoting clarity of illustration, the wire stuffer feed mechanism has not been illustrated in drawing FIGS. 1-12 but it is now noted that the mechanism about to be described may be mounted virtually anywhere on the apparatus 20, although it is preferred that it be mounted to the right hand side plate 24 with a guide tube directed downwardly and toward the crimping station as shown at 200 in FIG. 1.

Figure 15:
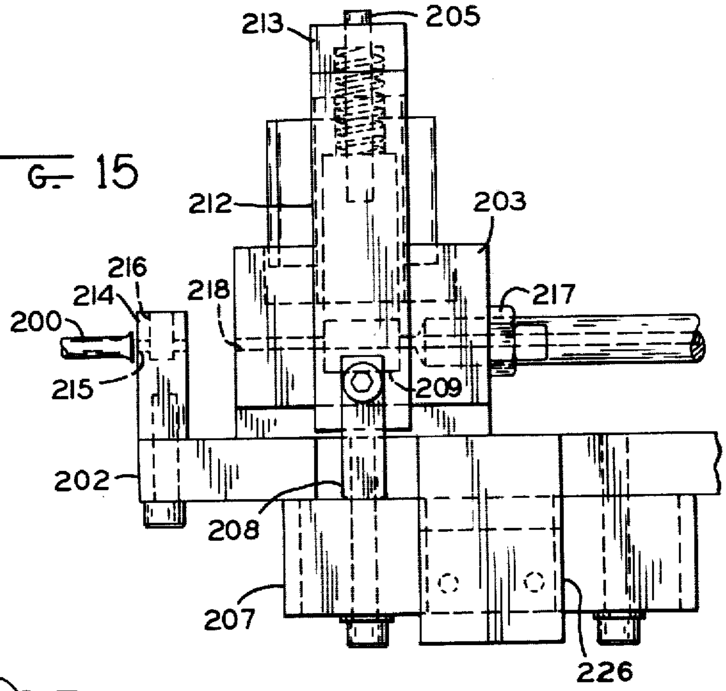
FIG. 15 is a view, with parts removed and parts broken away, taken in the direction of arrows 15—15 in FIG. 13.
Figure 13:
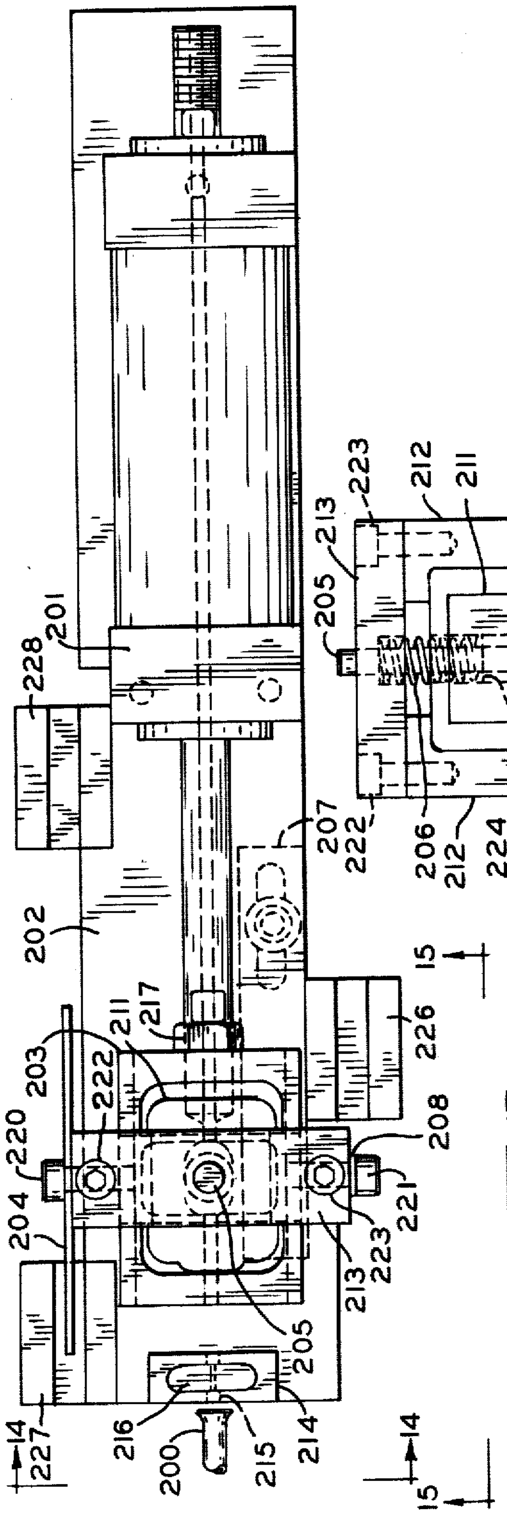
FIG. 13 is a top view of a wire stuffer mechanism used with the apparatus of FIG. 1.
Figure 14:
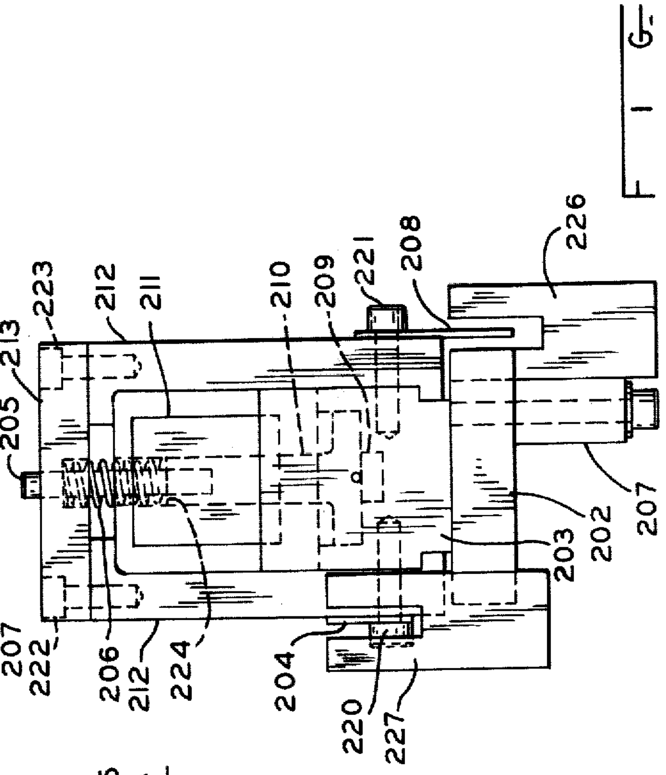
FIG. 14 is a view taken in the direction of arrows 14—14 in FIG. 13.

Reference will now be made continuously to FIGS. 13-15 considered together; with initial reference being to the left side of FIGS. 13 and 15. It will be noted that a flared end of the tube 200 (the other end of which is visible in FIG. 1) is in alignment with a wire exit hole 215 which is formed in a cold rolled steel wire guide 214. The wire guide 214 is fastened to a mounting plate 202 by a screw as best revealed in FIGS. 13 and 15 and a pocket is machined into the wire guide 214 to accomodate a soft rubber insert 216 which has a small hole formed therein through which stuffer wire is fed to the tube 200. The rubber insert 216 is a means of providing a frictional drag against movement of stuffer wire therethrough.

In general, and having specific reference now to FIG. 13, filler wire passes from the right to the left of the structure shown in FIG. 15. During a stuffer wire feeding sequence, a segment of the stuffer wire is clamped and moved to the left through the frictional resistance of the rubber block 216 and into the wire guide tube 200. At the end of the stuffer wire advancing stroke, crimping action will take place at the lead end of the stuffer wire as described hereinabove; and thereupon a wire advancing cylinder (cylinder 201 in FIGS. 13 and 15) will retract. After retraction of the cylinder 201 has been initiated, but before such retraction is completed, the stuffer or filler wire is unclamped while the cylinder 201 completes its retraction stroke. At the time that the filler wire is unclamped, it ceases to move with the retracting cylinder rod due to the frictional resistance applied to the stuffer wire by the rubber friction block 216.

With general reference now again to FIGS. 13–15 it will be noted that the mechanism there shown includes the previously mentioned cylinder 201 which was a Tom Thumb air cylinder, series DAV, style "B"; with a $1\frac{1}{8}$" bore, a 2" stroke, and a $\frac{5}{8}$" diameter rod with a 3/32" (2.38 mm) diameter hole through the entire length of the cylinder rod.

The cylinder 201 is mounted to the mounting plate 202 and the rod thereof is fastened at its end to, and thus carries, a carrier block 203. The carrier block 203 is fastened to the end of the rod by being threaded onto an end portion thereof, and a jam nut 217 prevents the carrier block 203 from becoming loosened on the cylinder rod. The carrier block 203 has a hole 218 bored therethrough so that stuffer wire fed through the cylinder rod will also feed through the carrier block.

Mounted to the carrier block for movement therewith is a small bearing or clamp pad insert 209 which most conveniently is glued to the carrier block 203. The insert 209 immediately underlies the path of the stuffer wire through the carrier block so that, when desired, the stuffer wire may be pressed downwardly against the insert 209 in order to clamp the wire thereagainst and prevent relative movement of the stuffer wire with respect to the carrier block 203. The carrier block also has fastened thereto, and carries therewith, two substantially identical generally C-shaped clamps 212. The clamps 212 are fastened to the carrier block by bolts 220 and 221; and a cap 213 is fastened to the clamps 212 with screws 222, 223. Also seen in FIG. 14 is a $1\frac{1}{2}$" (3.81 cm) long solid dowel guide rod having a diameter of 0.218" (5.54 mm).

The guide rod 205 serves as a retainer for a compression spring 206, with the compression spring 206 being seated in a counter bored hole machined into the cap 213. The spring 206 is trapped between the cap 213 and an end 224 of a cold rolled steel solenoid core 210. The dowel rod 205 is press fit into a hole bored into the solenoid core 210 and the rod 205 is slidably received in a hole that extends from the counterboard opening in the cap 213. Thus, as the solenoid core 210 is moved upwardly or downwardly as viewed in FIG. 14 (under the influence of its solenoid coil), guide rod 205 will move upwardly and downwardly through the hole in cap 213. However, when the solenoid coil is not energized, the compression spring 206 will urge the solenoid core 210 downwardly so that a lower face of the solenoid core will clamp stuffer wire against the insert 209. The solenoid coil is denoted by the reference numeral 211 and may be a purchased item. Preferably, a DECCO solenoid coil, Model 9-136M for use with a 60 hertz, 115 volt power supply is used as the coil 211. Any suitable means may be utilized to hold the solenoid coil 211 in position between the clamps 212, but, preferably, the core of the solenoid coil is merely clamped between the tops of the two clamp pieces 212 and a seat for such core that is machined in the block 203.

FIG. 14 also reveals that the right hand clamp 212 shown therein carries a flat steel actuator 208 held therewith for movement therewith by the screw 221. The actuators 204, 208 move into and out of proximity with three DYNAPAR pickups 226, 227, 228 that are the same types of devices as the DYNAPAR pickup 60 shown in FIG. 2 and fully described hereinabove. As will be understood the DYNAPAR pickups 226–228 are fastened to the mounting plate 202 by any suitable and convenient means, such as bolts, mounting brackets, etc.

It now will be appreciated that the wire stuffer feed described to this point includes, as primary parts thereof, a main air cylinder, a carrier block, and a solenoid coil mounted in the carrier block. Moreover, the stuffer or filler wire will pass through the cylinder rod and, as it passes through the carrier block, it may be clamped between a bearing plate (insert 209) and a solenoid core as the result of pressure being applied by a compression spring.

When filler wire is required for the apparatus (as signaled by the control described hereinabove and in more detail in the incorporated by reference disclosure of Bair and Hopkins), the cylinder 201 will advance its rod to the left as viewed in FIG. 13 and advance a clamped segment of wire. At the end of the cylinder rod stroke, the DYNAPAR actuator or flag 204 will enter the DYNAPAR pickup 227 and the signal supplied from pickup 227 is conveyed to the control means whereupon a crimping action will take place at the crimping station. When the crimped connection has been completed, the main control will cause the cylinder 201 to retract. At approximately the mid-point of the retraction of cylinder 201, the flag or actuator 208 (see FIGS. 14 and 15) will pass through the DYNAPAR pickup 226. This action causes the signal to be transmitted to the control means whereupon the control means immediately activates the solenoid coil 211 which will cause a retraction of the solenoid core and a corresponding compression of the compression spring 206 so that the filler wire is unclamped. This unclamping action will last for 5/16" (7.94 mm) of the cylinder retraction stroke whereupon the wire is reclamped. While the wire is unclamped, the wire does not move to do the friction gripping action of stationary rubber block 216. Reclamping of the wire is caused by a timer after the flag or actuator 208 enters into the DYNAPAR pickup 226.

The DYNAPAR pickups 228, 227, as will be understood, are interconnected with the main control means and the signals obtained from these two pickups also may be used by the main control means to indicate a malfunction of the stuffer wire feed. For example, at the time that the main control initiates extension or advancement of the cylinder 201, the DYNAPAR actuator or flag 204 will be in proximity with the DYNAPAR pickup 228. Assuming that there is no jamming of the stuffer wire in the tube 200, the cylinder 201 would extend and the DYNAPAR actuator 204 would come into proximity with the DYNAPAR pickup 227 in a fraction of a second. However, if the stuffer wire should buckle and fail to feed properly, it will offer resistance to extension of the cylinder 201 with the result that the DYNAPAR actuator 204 either will not be able to come into proximity with the DYNAPAR pickup 227; or with the result that the cylinder 201 will only be able to very slowly overcome the resistance of the buckled wire so that a period of 1½ or more seconds will elapse from the time of cylinder actuation until the time that the actuator 204 moves into proximity with the pickup 227. The main control means, as fully described in the incorporated by reference application of Bair and Hopkins is programmed so that it will indicate a stuffer wire malfunction if more than a preselected relatively short period of time elapses from the instant of cylinder actuation until the DYNAPAR pickup 227 indicates that the actuator 204 has moved into proximity therewith.

Although details have not been specifically illustrated herein showing the mounting of the mounting plate 202 to the apparatus and showing the mounting of tube 200 to the apparatus, it will be understood that angle iron or any other suitable type of bracket may be provided for supporting the mounting plate 202 from the main apparatus frame. Moreover, brackets or small arms will be mounted as needed to support the stuffer wire feed tube 200 which merely defines a path for the stuffer wire from the structure shown in FIG. 13 to the crimping station.

It will now be understood that we have disclosed new and improved methods and apparatus by which manufacturing operations may be carried out. While we have described preferred embodiments wherein crimping equipment is utilized for making crimped interconnections, it should be understood that our invention itself may be utilized in conjunction with the performance of manufacturing operations other than those where the preselected manufacturing apparatus is in the form of crimp connecting equipment. Thus, it will be understood that apparatus selected in connection with practicing the invention may be used to perform a plurality of distinct operations other than those that constitute the operations of making distinctly differently configured crimped connections. It also will be understood that while it is preferred to both manually condition and automatically condition the particular control means utilized, the control means could be virtually completely automatically conditioned so that virtually no manual control need be exercised in order to accomplish a desired operation at a work station. Moreover, it should be understood that modifications may be made so that the operational aspect of wire connecting apparatus that is automatically controlled could be those aspects of the apparatus that determine crimp height rather than total machine crimping steps for a given stator model, or the need for stuffer wire. It of course should also be understood that it would be possible to dispense with those portions of the control apparatus that automatically condition the automatic control means in response to the indicia bearing means and in that case it simply would be necessary for the operator to manually set switches or equivalent means to indicate the total number of crimping steps operations needed for a given stator model and to also indicate those specific connections where a stuffer wire is to be utilized.

While we have described specific preferred forms of our invention, and methods and apparatus for carrying out the objects described hereinabove, it should be understood that the above described and other modifications may be made therein without departing from the scope of the invention. Accordingly, our invention is to be interpreted and defined only by the claims appended hereto which form a part of this specification.

What we claim as new and desire to secure by Letters Patent of the United States is:

1. A method of performing manufacturing operations on an article involving utilization of preselected manufacturing apparatus while it is at least partly controlled by automatic control means, said apparatus being controllable to perform a plurality of distinct operations under the joint influence of an operator and the automatic control means, said method comprising: selecting a predetermined indicia bearing means for a preselected article; interfacing the predetermined indicia bearing means with the automatic control means and thereby conditioning the automatic control means to become operable for automatically controlling at least one operational aspect of the apparatus during the performance of the plurality of distinct operations; manually conditioning the control means in accordance with information derived from the indicia bearing means; manipulating a preselected article and positioning such preselected article so that a first distinct operation can be performed thereon at a work station of the apparatus; activating the apparatus and performing the first distinct operation on the preselected article with the apparatus performing the first distinct operation under the control of the control means; automatically conditioning the apparatus to perform a second distinct operation on the same preselected article; manipulating the same preselected article relative to the work station in preparation for the performance of the second distinct operation; activating the apparatus and performing the second distinct operation on the preselected article; and continuing to alternately manipulate the article and perform distinct operations thereon with the apparatus until the complete cycle of machine operation as determined by the automatic control means is completed.

2. A method of making different electrical interconnections with different lead wires extending from windings supported on the core of a given electric motor stator assembly, the method comprising: selecting an indicia bearing means for a stator assembly model corresponding to the model of the given stator assembly; interfacing the selected indicia bearing means with an automatic control means of a wire connecting apparatus and thereby automatically conditioning the automatic control means to become operable for automatically controlling at least one operational aspect of the wire connecting apparatus during the performance of a plurality of distinct wire connecting operations and manually conditioning the control means in accordance with information derived from the indicia bearing means so that the control means will automatically cause the apparatus to make wire interconnections of predetermined configurations at the command of an operator; moving the core, windings, and lead wires toward a wire connecting device carried by the apparatus and orienting and positioning a first lead wire relative to the device so as to position the first lead wire at a connecting station; commanding the apparatus to make a first wire interconnection involving the first lead wire whereby the control means automatically causes the apparatus to form a first electrical interconnection involving the first lead wire, and with the first electrical interconnection having a first one of at least two different interconnection configurations; orienting and positioning a second lead wire relative to the device so as to position the second lead wire at the connecting station; commanding the apparatus to make a second wire interconnection involving the second lead wire whereby the control means automatically causes the apparatus to form an electrical interconnection involving the second lead wire and of an interconnection configuration different from the interconnection configuration of the first electrical interconnection.

3. Apparatus for use in performing a number of winding lead connection operations on lead wires extending from a stator assembly wherein at least two different lead wires are to be interconnected in at least two different interconnection configurations, wherein said apparatus comprises interconnection establishing means located at an interconnection establishing station, a selectively positionable toggle linkage support for establishing the height of different interconnections, means for controlling the operational mode of the interconnection establishing means, and means for conditioning the means for controlling; the improvement wherein: said means for controlling comprises a programmable control means for sequentially establishing a plurality of wire interconnections that each have a distinct interconnection configuration; said means for conditioning the means for controlling including manual switch means interconnected with said programmable control means and automatic information transformation means automatically responsive to indicia bearing means and interconnected with the programmable control means so that data carried by indicia bearing means is operable to automatically establish operational sequences of the programmable control means; and wherein said apparatus includes means for continuously monitoring the position of the toggle linkage support and also means for continuously varying the position of the toggle linkage support within predetermined minimum and maximum limits.

4. The apparatus of claim 3 wherein the selectively positionable toggle linkage support comprises an eccentric supported for rotational movement and wherein the apparatus further comprises a motor having a rotatable shaft interconnected with the eccentric for changing the rotational position of the eccentric shaft.

5. The apparatus of claim 4 wherein the apparatus further comprises an encoder for determining the rotational position of the eccentric shaft.

6. The apparatus of claim 5 wherein the encoder for determining the rotational position of the eccentric shaft provides a signal indicative of the relative rotational position of the shaft.

7. The apparatus of claim 6 wherein said motor comprises a stepper motor.

8. An apparatus for establishing crimped connections involving at least two different lead wires of a dynamoelectric machine stator assembly of a given model, said apparatus being of the type for establishing connections of different configurations at a crimping station, the improvement wherein: said apparatus includes manually presettable switch means; automatic information transformation means automatically responsive to indicia bearing means; and programmable control means, interconnected with the information transformation means, for determining the configuration of connections made at the crimping station in response to the information transformation means; operation of the apparatus in establishing different connection configurations being determined automatically by the apparatus in response both to the manually presettable switching means and in response to indicia bearing means that represent manufacturing sequence instructions for stator assemblies of the given model.

9. A method of making crimped splice interconnections for an electric motor stator assembly involving utilization of crimping apparatus while it is at least partly controlled by automatic control means, said apparatus being controllable to make a plurality of distinctly differently configured crimped interconnections under the joint influence of an operator and the automatic controls means, said method comprising: selecting a predetermined indicia bearing means for a preselected stator assembly model; interfacing the predetermined indicia bearing means with the automatic control means and thereby conditioning the automatic control means to become operable for automatically controlling at least one operational aspect of the apparatus during the production of the plurality of differently configured crimped interconnections; manually conditioning the control means in accordance with information derived from the indicia bearing means; manipulating a stator assembly of the same preselected model and positioning such stator assembly so that a first crimped interconnection can be performed thereon at a crimping station of the apparatus; activating the apparatus and establishing the first crimped interconnection on the stator assembly with the apparatus making the first interconnection under the control of the control means; automatically conditioning the apparatus to make a second and different interconnection for the same stator assembly; manipulating the same stator assembly relative to the crimping station in preparation for making the second interconnection; activating the apparatus and making the second interconnection; and continuing to alternately manipulate the stator assembly and make interconnections with the apparatus until the complete cycle of apparatus operation, as determined by the automatic control means, is completed.

10. A method of making different electrical interconnections with different lead wires extending from windings supported on the core of a given stator assembly, the method comprising: selecting an indicia bearing means for a stator assembly model corresponding to the model of the given stator assembly; utilizing the selected indicia bearing means and conditioning the automatic control means to become operable for controlling operational aspects of the wire connecting apparatus during the performance of a plurality of distinct wire connecting operations so that the control means will automatically cause the apparatus to make wire interconnections of predetermined configurations at the command of an operator; moving the core, windings, and lead wires toward a wire connecting device carried by the apparatus and orienting and positioning a first lead wire relative to the device so as to position the first lead wire at a connecting station; commanding the apparatus to make a first wire interconnection involving the first lead wire whereby the control means automatically causes the apparatus to form a first electrical interconnection involving the first lead wire, and with the first electrical interconnection having a first one of at least two different interconnection configurations; orienting and positioning a second lead wire relative to the device so as to position the second lead wire at the connecting station; commanding the apparatus to make a second wire interconnection involving the second lead wire whereby the control means automatically causes the apparatus to form an electrical interconnection involving the second lead wire and of an interconnection configuration different from the interconnection configuration of the first electrical interconnection.

11. A method of performing manufacturing operations on elements of an electric motor involving utilization of preselected manufacturing apparatus while it is at least partly controlled by automatic control means, said apparatus being controllable to perform a plurality of distinct operations under the joint influence of an operator and the automatic control means, said method comprising: selecting a predetermined indicia bearing means for a preselected electric motor; interfacing the predetermined indicia bearing means with the automatic control means and thereby conditioning the automatic control means to become operable for automatically controlling at least one operational aspect of the apparatus during the performance of the plurality of distinct operations; conditioning the control means in accordance with information derived from the indicia bearing means; manipulating at least a first element of the preselected electric motor and positioning such first element so that a first distinct operation can be performed thereon at a work station of the apparatus; activating the apparatus and performing the first distinct operation on the first element of the electric motor with the apparatus performing the first distinct operation under the control of the control means; automatically conditioning the apparatus to perform a second distinct operation on a second element of the same electric motor; manipulating the second element of the same electric motor relative to the work station in preparation for the performance of the second distinct operation; activating the apparatus and performing the second distinct operation on the second element of the electric motor; and continuing to alternately manipulate other elements of the electric motor and perform distinct operations with the apparatus until the complete cycle of machine operation as determined by the automatic control means is completed.

* * * * *